United States Patent

Ogura et al.

[15] 3,703,706

[45] Nov. 21, 1972

[54] RECORD VERIFICATION APPARATUS

[72] Inventors: Mitsuo Ogura; Satoshi Itoh, both of Odawara, Japan

[73] Assignee: Hitachi, Ltd., Tokyo, Japan

[22] Filed: Feb. 17, 1971

[21] Appl. No.: 116,200

[30] Foreign Application Priority Data

Feb. 20, 1970 Japan ......................45/14187

[52] U.S. Cl. ........................................340/146.1 BA
[51] Int. Cl. ..............................................G06k 5/00
[58] Field of Search .............340/146.1 BA; 235/153

[56] References Cited

UNITED STATES PATENTS

| | | | |
|---|---|---|---|
| 2,700,755 | 1/1955 | Burkhart | 340/146.1 |
| 3,117,306 | 1/1964 | Reiffort | 340/146.1 |
| 3,246,292 | 4/1966 | Woo | 340/146.1 |

*Primary Examiner*—Charles E. Atkinson
*Attorney*—Craig, Antonelli, Stewart & Hill

[57] ABSTRACT

A record verification apparatus for comparing information of a block to be verified with verifying information so as to verify the former information. In the apparatus, information of the succeeding block is supplied to a first storage position of a memory to be compared with information of the preceding block having been previously verified, and information indicative of coincidence or non-coincidence therebetween is stored in a second storage position of the memory. Verifying information is compared with the information to be verified stored in the first storage position of the memory or with the coincidence or non-coincidence information stored in the second storage position of the memory to carry out the verification of the information to be verified.

10 Claims, 5 Drawing Figures

INVENTORS
MITSUO OGURA AND
SATOSHI ITOH
BY Craig, Antonelli, Stewart & Hill
ATTORNEYS

RECORD VERIFICATION APPARATUS

BACKGROUND OF THE INVENTION

This invention relates to record verification apparatus. More particularly, it relates to a record verification apparatus for verifying information recorded on a recording medium such as, for example, a magnetic tape, punched card or core memory.

No error is allowable in information supplied to a data processing system adapted for the processing of data. Cards are generally used as a means for supplying information to a data processing system. Such information is punched in the card and is supplied to the data processing system after verification by a key card verifier.

A key magnetic tape apparatus of recent development draws attention of those working in this field in that it eliminates the use of the cards and information can be directly recorded on a magnetic tape by an associated keyboard. In this key magnetic tape apparatus too, as in other recording expedients, it is necessary to verify the record before the record is supplied to a data processing system as information to be subjected to the data processing. A general method for the verification of the record comprises reading out a block on the magnetic tape, striking the keys of the keyboard while looking at the same slip as that from which the information of the particular block has been recorded on the magnetic tape, and comparing the information supplied from the keyboard with the information recorded on the magnetic tape so as to verify whether the information recorded on the magnetic tape is correct or not. Suppose that each block consists of eighty columns, then it is necessary to strike the character keys eighty times. However, when the information recorded on the portion ranging from, for example, the twentieth to the thirtieth column of the succeeding block is the same as the information recorded on the range of from the twentieth to the thirtieth column of the preceding block which has been previously verified, a duplicate key or DUP key on the keyboard may be struck to carry out the verification of this part without striking the character keys. A single key (DUP key in this case) can be continuously struck at a far higher speed than when various different character keys are successively struck. A memory having a capacity of two blocks is required in order that the information ranging from the 20th to the 30th column of the preceding block having been previously verified can be satisfactorily compared with the information ranging from the twentieth to the 30th column of the succeeding block. This applies not only to the key magnetic apparatus but also to other apparatus including the key card verifier.

SUMMARY OF THE INVENTION

It is therefore a primary object of the present invention to provide a record verification apparatus having a memory of small capacity.

The record verification apparatus according to the present invention comprises a memory having a first storage position and a second storage position and means for comparing the information to be verified with information already stored in the first storage position of the memory. Information indicative of coincidence or non-coincidence between these pieces of information is stored in the second storage position of the memory and the information to be verified is stored in the first storage position of the memory. In order to verify the information to be verified, first verifying information, or more practically, information obtained by striking the character keys is compared with the information to be verified stored in the first storage position of the memory. Further, when the information in a certain column range of the preceding block is the same as the information in the same column range of the succeeding block, second verifying information, or more practically, a signal responsive to the striking of the DUP key is collated with the coincidence or non-coincidence information supplied from the second storage position of the memory so as to verify whether the record is correct or not.

According to the present invention, the information to be verified is compared, in the course of being stored in the memory for the verification, with the information of the preceding block having been already verified, and information indicative of coincidence or non-coincidence therebetween is stored in the memory and is collated with the signal responsive to the striking of the DUP key. Thus, the storage of the preceding block is unnecessary, and therefore, the memory capacity can be reduced to about one half of the prior art memory capacity.

DESCRIPTION OF THE PREFERRED EMBODIMENT

Figures 1A, 1B, 1C:
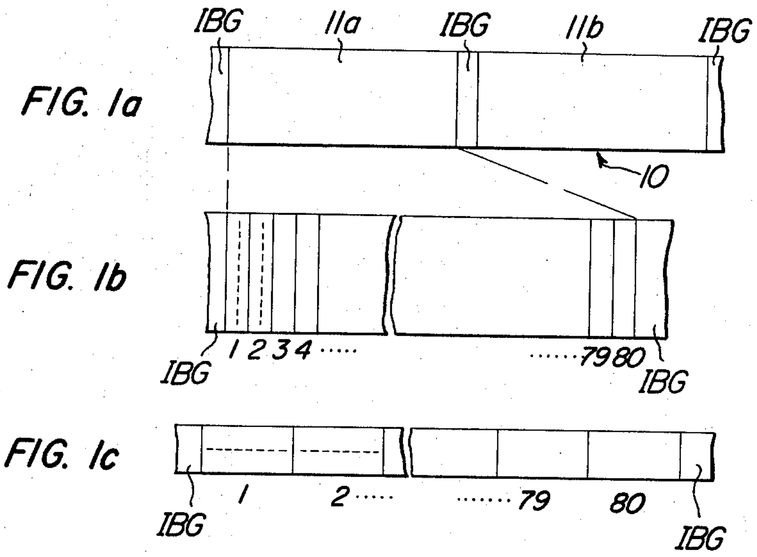
FIGS. 1*a* to 1*c* show the state of information recorded on a recording medium.

Referring to FIGS. 1*a* to 1*c*, a plurality of spaced blocks 11*a*, 11*b*, . . . are continuously recorded on a magnetic medium 10 which may be a magnetic tape. These blocks 11*a*, 11*b*, . . . are separated from each other by an inter-block gap IBG having no record thereon. Each block comprises, for example, 80 columns and one character is recorded in each column. Each character is constituted by eight bits of the binary system. The bits in the adjacent columns are recorded in parallel as shown in FIG. 1*b* or in series as shown in FIG. 1*c*.

Figures 2, 3:
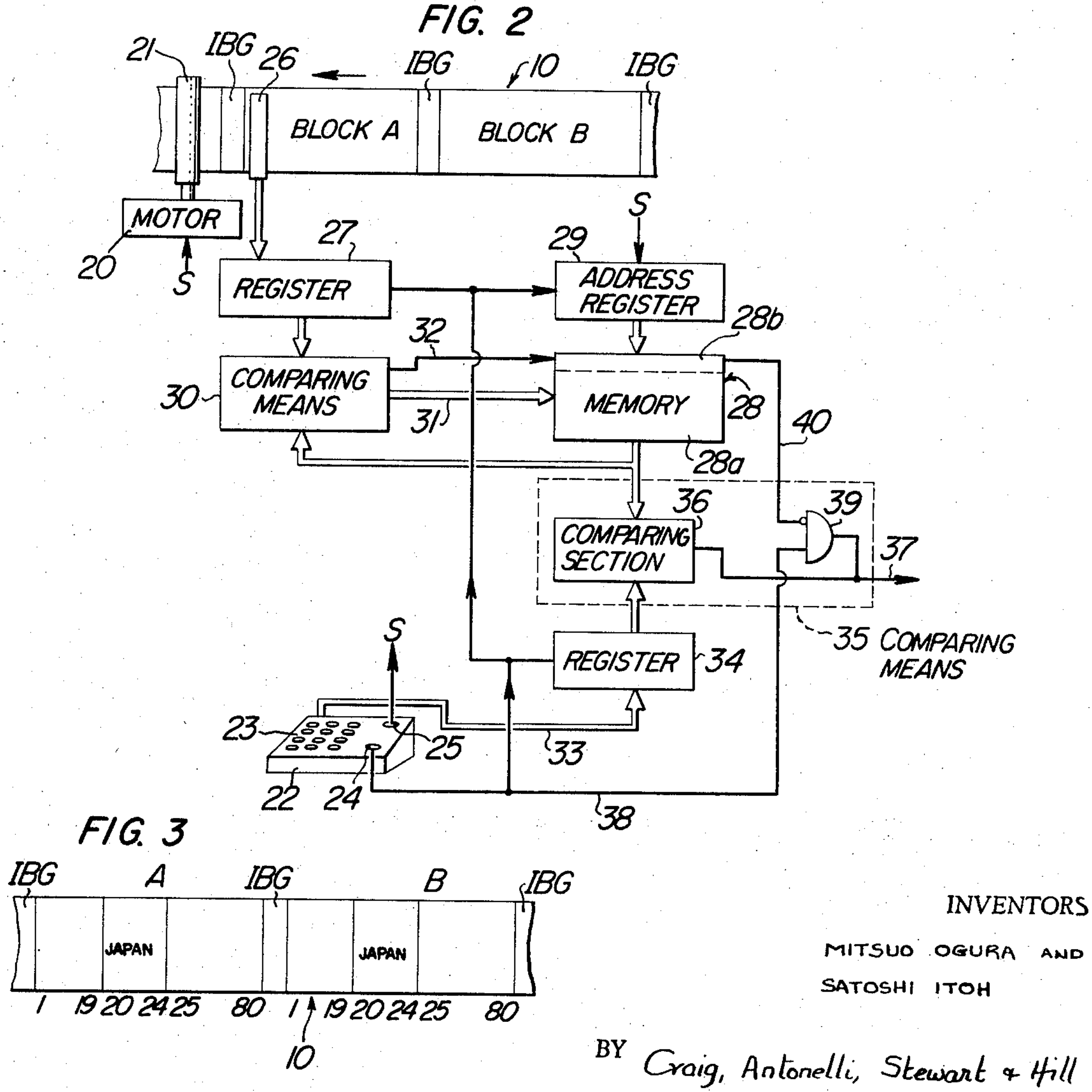
FIG. 2 is a block diagram of an embodiment of the present invention.
FIG. 3 shows an example of information recorded on the magnetic tape shown in FIG. 2.

Referring to FIG. 2 showing an embodiment of the present invention, blocks A and B are recorded on a magnetic tape 10 and spaced from each other by an inter-block gap IBG. Characters are recorded on the magnetic tape 10 in a form such as shown in FIG. 1*b*. The magnetic tape 10 is fed in the direction as shown by the arrow by a capstan 21 driven by a motor 20. A keyboard 22 is provided with a number of character keys 23, a DUP key 24 and a start key 25. A start signal S is delivered in response to the striking of the start key 25 and is applied to the motor 20 for feeding the magnetic tape 10 in the left-hand direction.

Information (that is, information to be verified) recorded on the magnetic tape 10 is read out by a magnetic head 26 to be supplied to a register 27 having a capacity of one byte (eight bits). When the information to be verified is set in the register 27, its signal is applied to an address register 29 for a memory 28. In simultaneous relation with the feeding of the magnetic tape 10, the signal S is also applied to the address register 29 so that "0" is set in the address register 29, and "1" is added to the content of the address register 29 each time the signal is applied from the register 27.

The memory 28 comprises a first storage position **28*a* and a second storage position 28*b*. The first storage position 28*a* has a capacity equal to the capacity of one block of the magnetic tape 10 so that 80 columns of eight-bit binary information can be stored therein. The second storage position 28*b* has a capacity of eighty bits so that its one bit position corresponds to each column of the first storage position 28*a*. The information is read out from and written into the first and second storage positions 28*a* and 28*b* of the memory 28 according to instructions applied from the address register 29. The information read out from the first storage position 28*a* of the memory 28 is transferred to a comparing means 30. On the other hand, the information to be verified is supplied from the register 27 to the comparing means 30 so as to be compared with the information supplied from the memory 28. The information to be verified is stored in the column of the first storage position 28*a* indicated by the address register 29 by way of a lead 31, that is, in the same column from which the preceding information has been read out from the memory 28 to be supplied to the comparing means 30. At the same time, information indicative of coincidence or noncoincidence between these two pieces of information, that is, information representing the result of comparison between these two bits of information is stored in the corresponding column of the second storage position 28*b* by way of a lead 32. For example, when the information to be verified recorded in the first column of the block A is in accord with the character information stored in the first column of the first storage position 28*a*, the coincidence information or "1" is set in the first column of the second storage position 28*b*. When they are not in accord with each other, the non-coincidence information or "0" is set in the first column of the second storage position 28*b***.

The information of the 80 characters is continuously detected by the magnetic head 26 and supplied to the register 27 since the magnetic tape 10 is continuously fed between an inter-block gap IBG and the next inter-block gap IBG, that is, in the range corresponding to one block. Therefore, "1" is added to the content of the address register 29 each time the character information is supplied to the register 27, and the content of the memory 28 ranging from the first to the 80th column is successively read out, while the output from the comparing means 30 is successively stored in the memory 28. In this manner, the information indicative of coincidence or non-coincidence between the information of the block A to be verified and the information of the preceding block having been stored in the memory 28 is successively stored in the memory 28.

The keyboard 22 is provided with a number of character keys 23 as described above. When the character key 23 is struck, the corresponding character code is supplied to a register 34 of a one-byte capacity by way of a lead 33. As soon as the character information is set in the register 34, it applies a signal to the address register 29 so that "1" is added to the content of the address register 29. The address register 29 shows a 0 address in the state in which the information of one block to be verified is stored in the memory 28. Therefore, the information of the first column of the block A to be verified and the coincidence or non-coincidence information corresponding to that column are read out when the first character information is set in the register 34. The character information supplied from the keyboard 22 to the register 34 is called the first verifying information. The first verifying information is supplied from the register 34 to a comparing section 36 in a comparing means 35 in which this information is compared with the information to be verified stored in the first storage position **28*a* of the memory 28. An error signal appears on a lead 37 when they are not in accord with each other. Errors can be easily detected since the character keys 23** are struck while looking at the same slip with that from which the information of the block A was recorded. It will thus be understood that the information in the 80-column block A can be verified.

Then when the start key 25 on the keyboard 22 is struck, the information of the block B to be verified is now read out. The information in the block A having been already verified is stored in the first storage position **28*a* of the memory 28, and the comparing means 30 automatically compares the information in the block A with the information in the block B from column to column. Upon completion of the comparison over the 80 columns, therefore, the information in the block B to be verified is now stored in the first storage position 28*a* of the memory 28, and information indicative of coincidence or non-coincidence between the blocks A and B is stored in the second storage position 28*b* of the memory 28. Suppose, for example, that the same information "JAPAN" is recorded in the range of from the 20th to the 24th column of both the blocks A and B as shown in FIG. 3, then "1" is set in each of the 20 th, 21st, 22nd, 23rd and 24th columns of the second storage position 28*b* of the memory 28. When the same information is recorded in other columns, "1" is set in each of these columns of the second storage position 28*b* of the memory 28**.

During the verification of the block B, the character keys 23 are struck in the range of from the first to the 19th column, and the character codes (information to be verified) stored in the first storage position **28*a* of the memory 28 are compared with the character codes (first verifying information) supplied from the keyboard 22 as in the case of the verification of the block A. The character codes in the range of from the 20th to the 24th column can be similarly compared. The verification in this range can be attained by striking the DUP key 24 in lieu of the character keys 23. In response to the striking of the DUP key 24, a signal DUP (second verifying information) is applied to the comparing means 35 by way of a lead 38. This signal DUP is also applied to the address register 29 to add "1" to the content of the address register 29. The second verifying information is applied to an AND gate 39 as one of the inputs to the AND gate 39. Another input to the AND gate 39 is the coincidence or non-coincidence information supplied from the second storage position 28***b* of the memory 28 by way of a lead 40. An error signal is delivered from the AND gate 39 to appear on the lead 37 when the input applied from the second storage position 28*b* of the memory 28 is "0," while no output is delivered from the AND gate 39 when this input is "1." The fact that "1" is set in a column of the second storage position 28*b* of the memory 28 means that the information in this column is the same as the information in the same column of the preceding block (block A already having been verified), and therefore any comparison between this information and the first verifying information is unnecessary. Thus, in the range of from the 20th to the 24th column of the block B, verification can be carried out by striking the DUP key 24 to supply the second verifying information and by collating this information with the coincidence or non-coincidence information supplied from the second storage position 28*b* of the memory 28.

It will be understood from the foregoing description that information of a block to be verified is compared with information of the preceding block before being stored in a memory, and the result of comparison therebetween is also stored in the memory. By virtue of this arrangement, a memory whose capacity is about one half of the capacity of prior art memories can be satisfactorily used for the verification of a record.

It is to be noted that the application of the present invention which aims at the verification of information is not limited to a key magnetic tape apparatus of the kind described hereinbefore, but is applicable also to various apparatus including card verifiers and to the verification of a record carried by a memory such as a core memory.

I claim:

1. A record verification apparatus for verifying information recorded as a block comprising a memory having a first storage position and a second storage position, first comparing means, coupled to said memory, for comparing information to be verified with information stored in the first storage position of said memory so as to store information indicative of coincidence or non-coincidence between these two pieces of information in the second storage position and, at the same time, store said information to be verified in the first storage position, means for producing first verifying information, means for producing second verifying information, and second comparing means coupled to said memory and to said means for producing said first and second verifying information for selectively carrying out the comparison between said first verifying information and said information to be verified stored in said first storage position and the comparison between said second verifying information and said coincidence or non-coincidence information stored in said second storage position.

2. A record verification apparatus as claimed in claim 1, in which said information to be verified is recorded as individual blocks on a magnetic tape, and said information of one block is continuously detected from said magnetic tape to be supplied to said first comparing means.

3. A record verification apparatus as claimed in claim 1, in which both said first and second storage positions of said memory include a plurality of equally corresponding columns so that the read-out and write-in of information can be carried out concurrently.

4. A record verification apparatus as claimed in claim 1, in which a keyboard having a number of character keys and a single DUP key is provided so as to produce said first verifying information in response to the striking of said character keys and to produce said second verifying information in response to the striking of said DUP key.

5. A record verification apparatus for verifying information recorded in block form comprising:

a memory having a first storage section and a second storage section;

first means, coupled to receive information to be verified, and responsive to the contents of said first storage section of said memory, for comparing the received information and the contents of said first storage section and supplying the result of said comparison, representative of the coincidence or non-coincidence of the received information and the contents of said first storage section, to said second storage section of said memory to be stored therein, said result being thereby stored in said second storage section;

second means for producing first verifying information;

third means for producing second verifying information; and fourth means, responsive to the contents of said first and second memory sections and being coupled to said second and third means, for comparing the contents of said first memory section with said first verifying information and the contents of said second memory section with said second verifying information and for generating signals representative of the results of the latter comparisons.

6. A record verification apparatus according to claim 5, further including means for supplying said information to be verified in individual blocks on magnetic tape, and means for continuously detecting the information in an individual block on said tape and supplying said detected information to said first means.

7. A record verification apparatus according to claim 6, wherein the storage positions of said first and second memory sections correspond to the positions of the increments in an individual block.

8. A record verification apparatus according to claim 5, wherein said fourth means comprises a first comparing section, for comparing the contents of said first memory section with said first verifying information and an AND gate for comparing the contents of said second memory section with the output of said third means.

9. A record verification apparatus according to claim 7, wherein said fourth means comprises a first comparing section, for comparing the contents of said first memory section with said first verifying information and an AND gate for comparing the contents of said second memory section with the output of said third means.

10. A record verification apparatus according to claim 9 wherein said second and third means comprise the character key and duplication key information outputs of a keyboard.

* * * * *